Nov. 6, 1934.   W. P. WILSON   1,979,720
DIRECTOR
Filed Jan. 20, 1930   15 Sheets-Sheet 1

Inventor
W. P. Wilson
DECEASED
BY MARIE P. WILSON
ADMINISTRATRIX
By W. N. Roach
Attorney

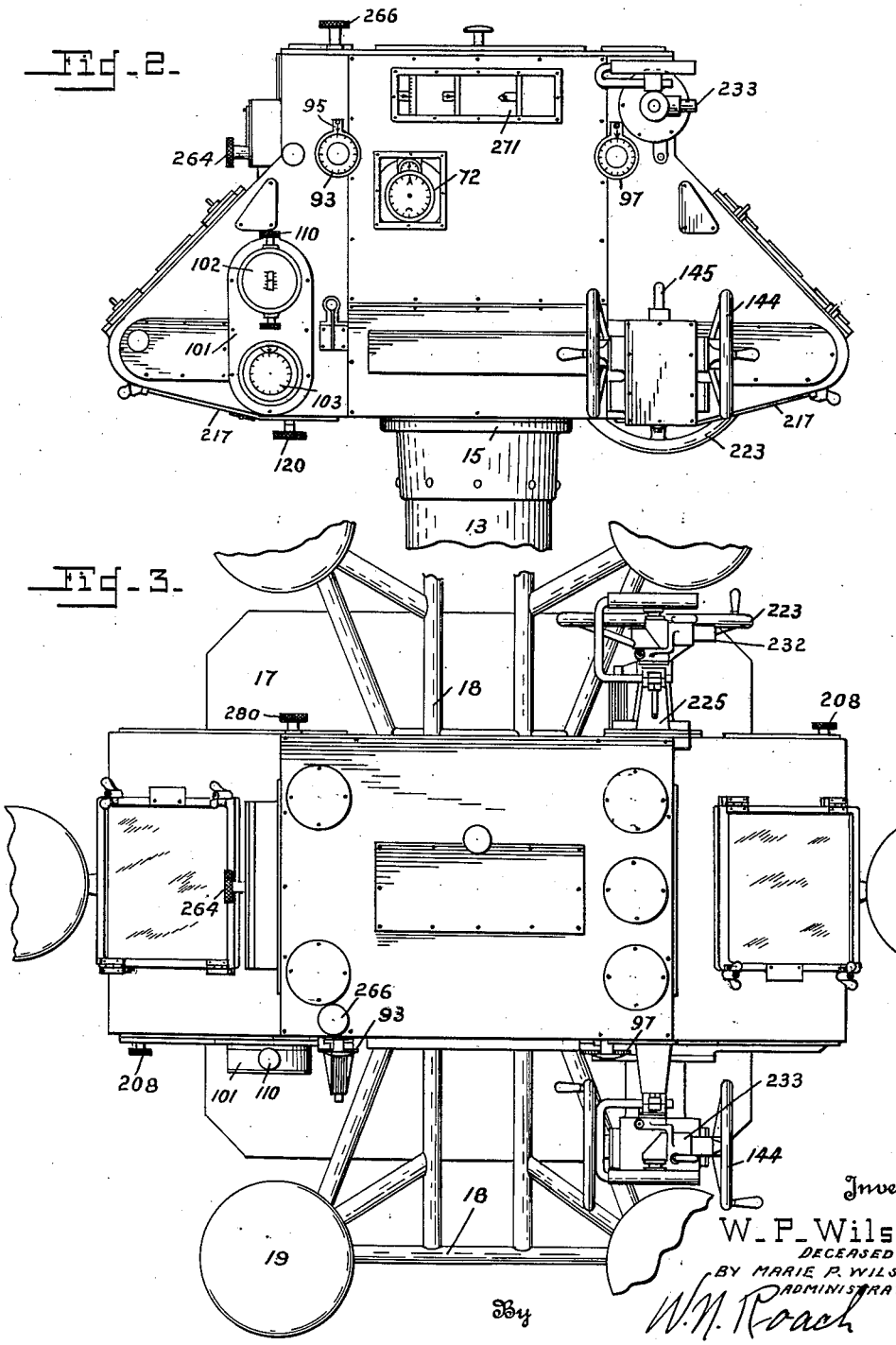

Nov. 6, 1934.  W. P. WILSON  1,979,720
DIRECTOR
Filed Jan. 20, 1930  15 Sheets-Sheet 3
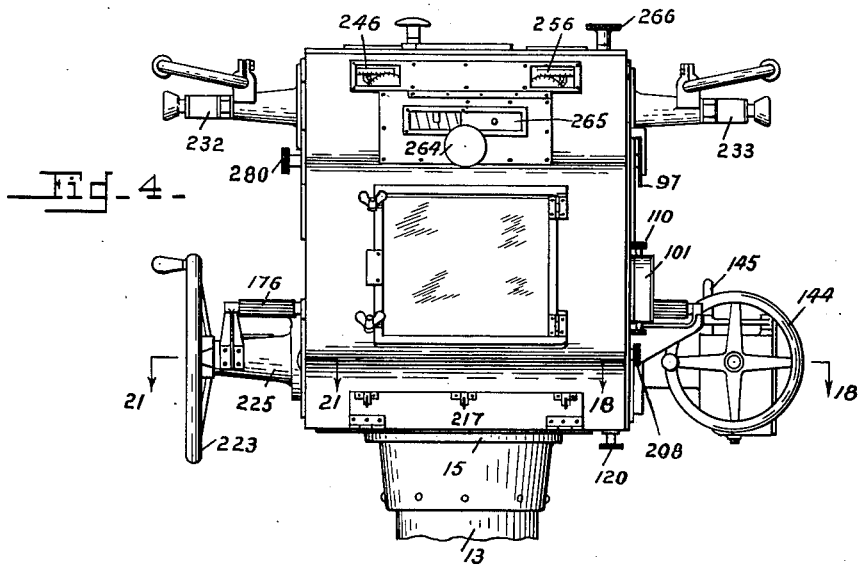
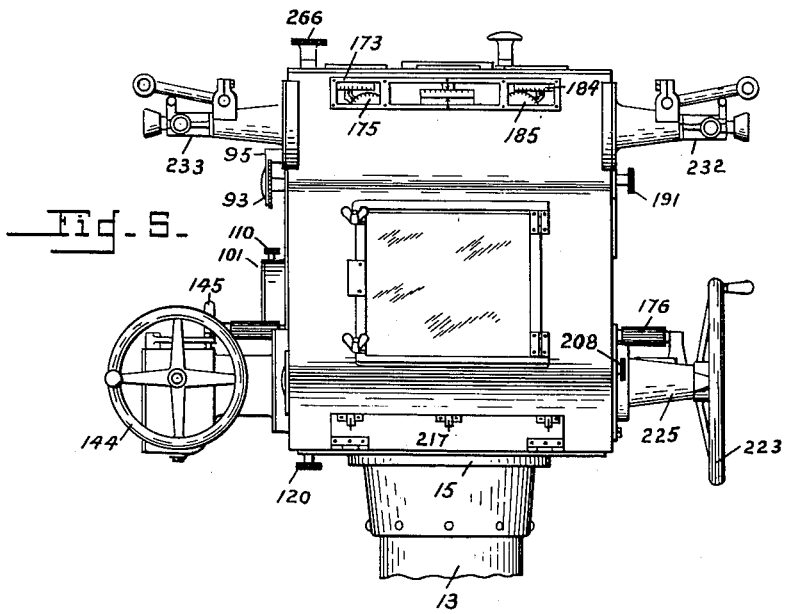
Inventor
W. P. Wilson
DECEASED
BY MARIE R. WILSON
ADMINISTRATRIX
By W. N. Roach
Attorney Nov. 6, 1934.  W. P. WILSON  1,979,720
DIRECTOR
Filed Jan. 20, 1930  15 Sheets-Sheet 4
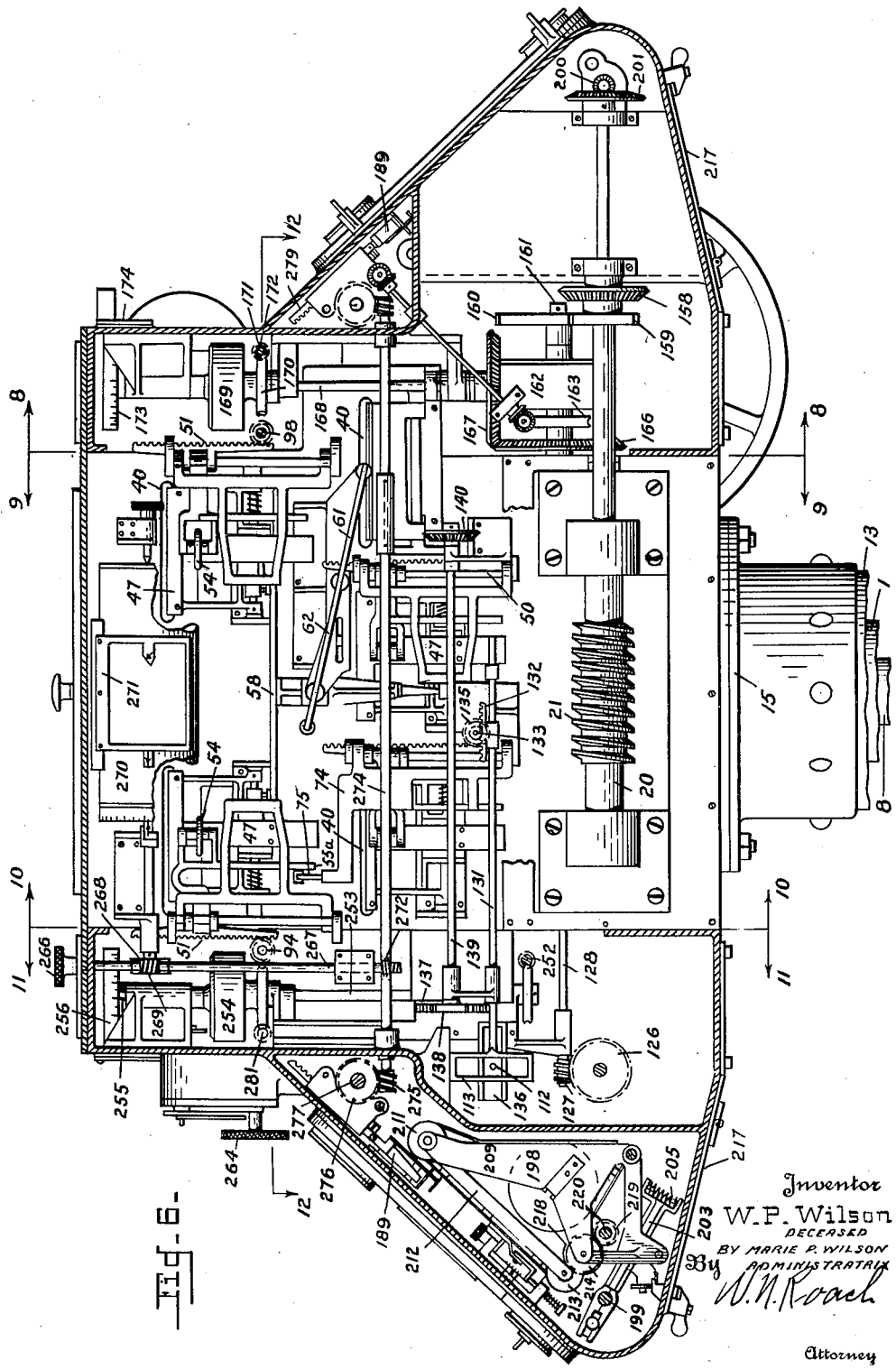

Nov. 6, 1934.    W. P. WILSON    1,979,720
DIRECTOR
Filed Jan. 20, 1930    15 Sheets-Sheet 5
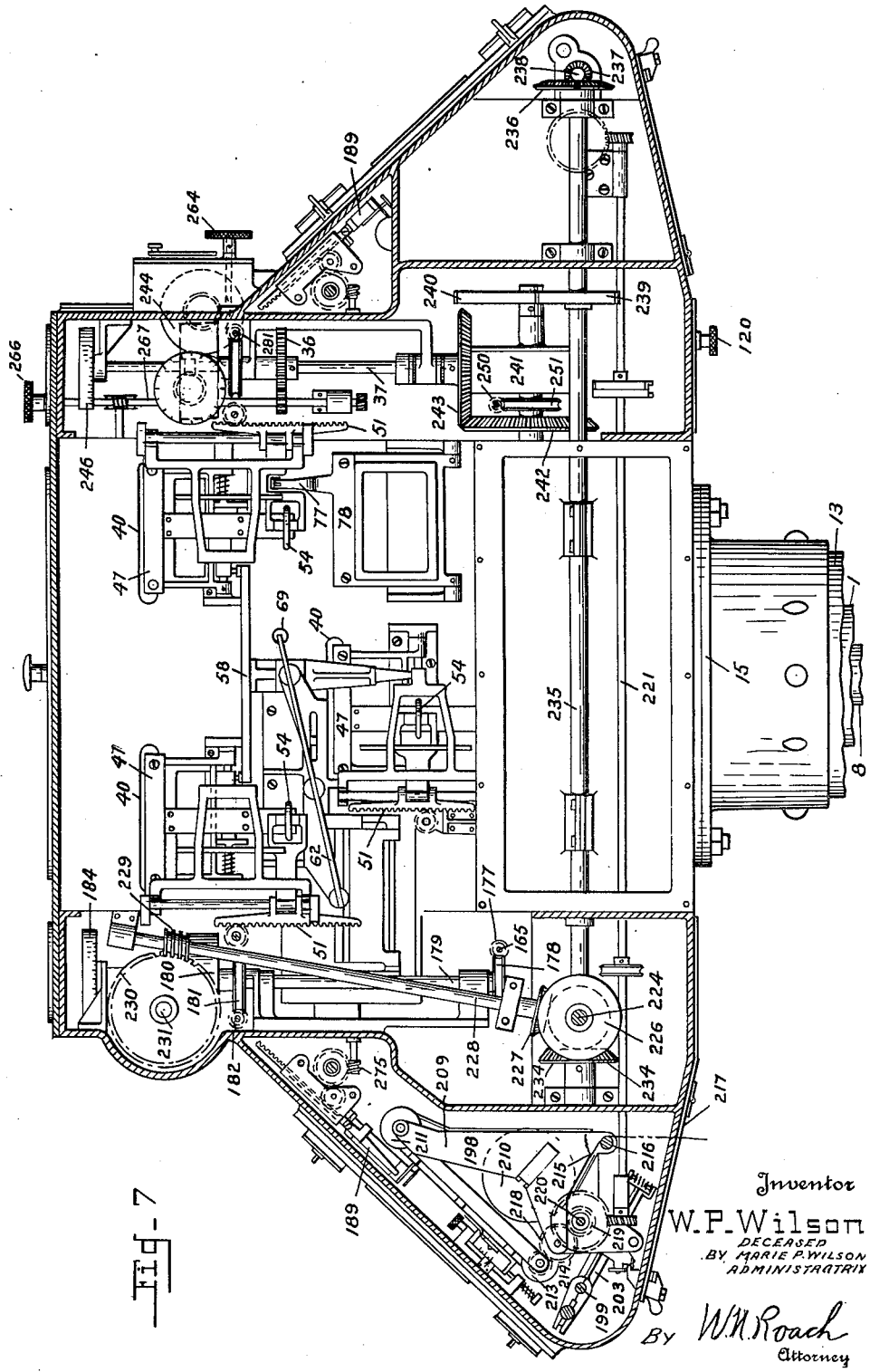

Nov. 6, 1934.  W. P. WILSON  1,979,720
DIRECTOR
Filed Jan. 20, 1930  15 Sheets-Sheet 6
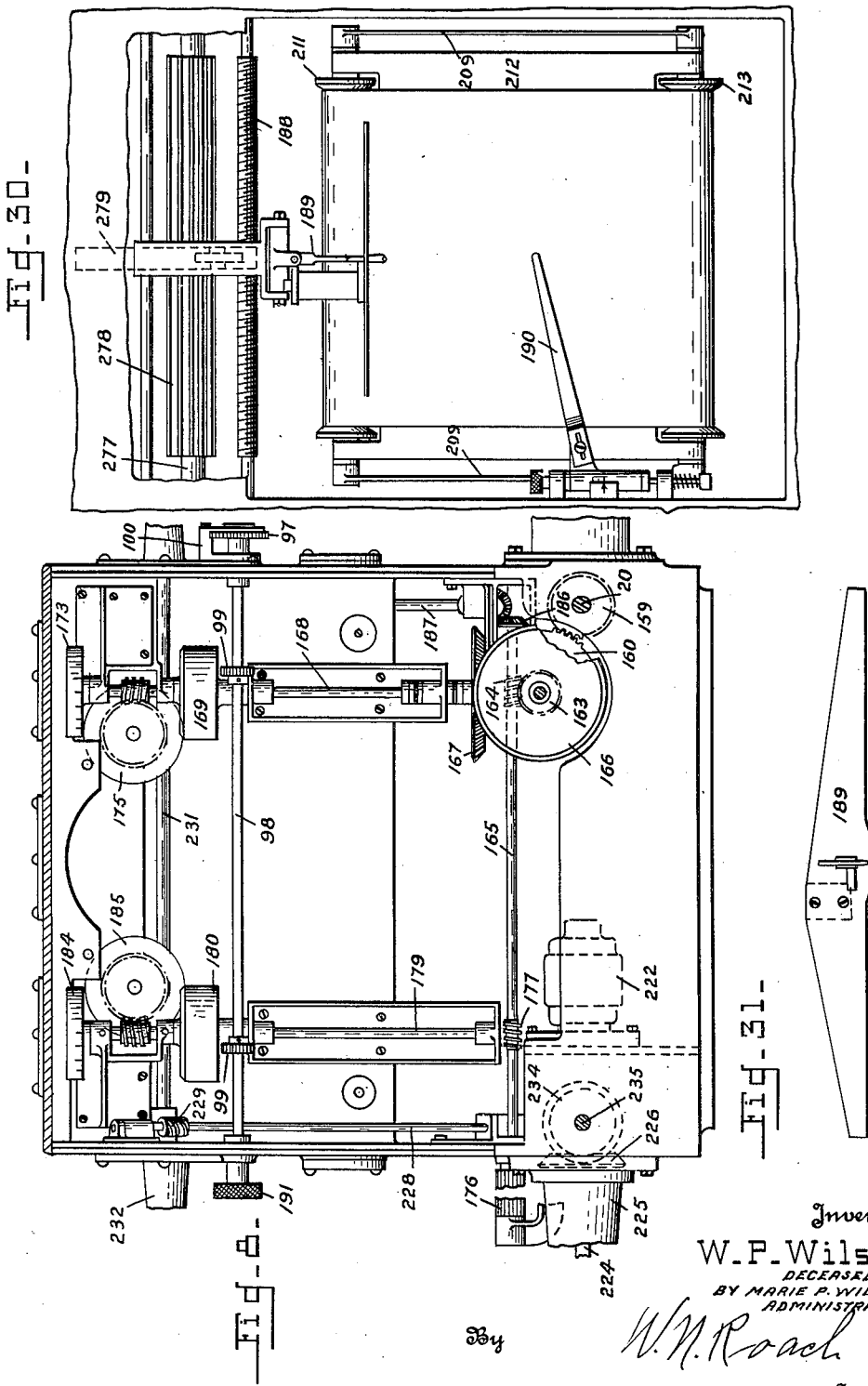
Inventor
W. P. Wilson
DECEASED
BY MARIE P. WILSON
ADMINISTRATRIX
By W. N. Roach
Attorney Nov. 6, 1934.    W. P. WILSON    1,979,720
DIRECTOR
Filed Jan. 20, 1930    15 Sheets-Sheet 7
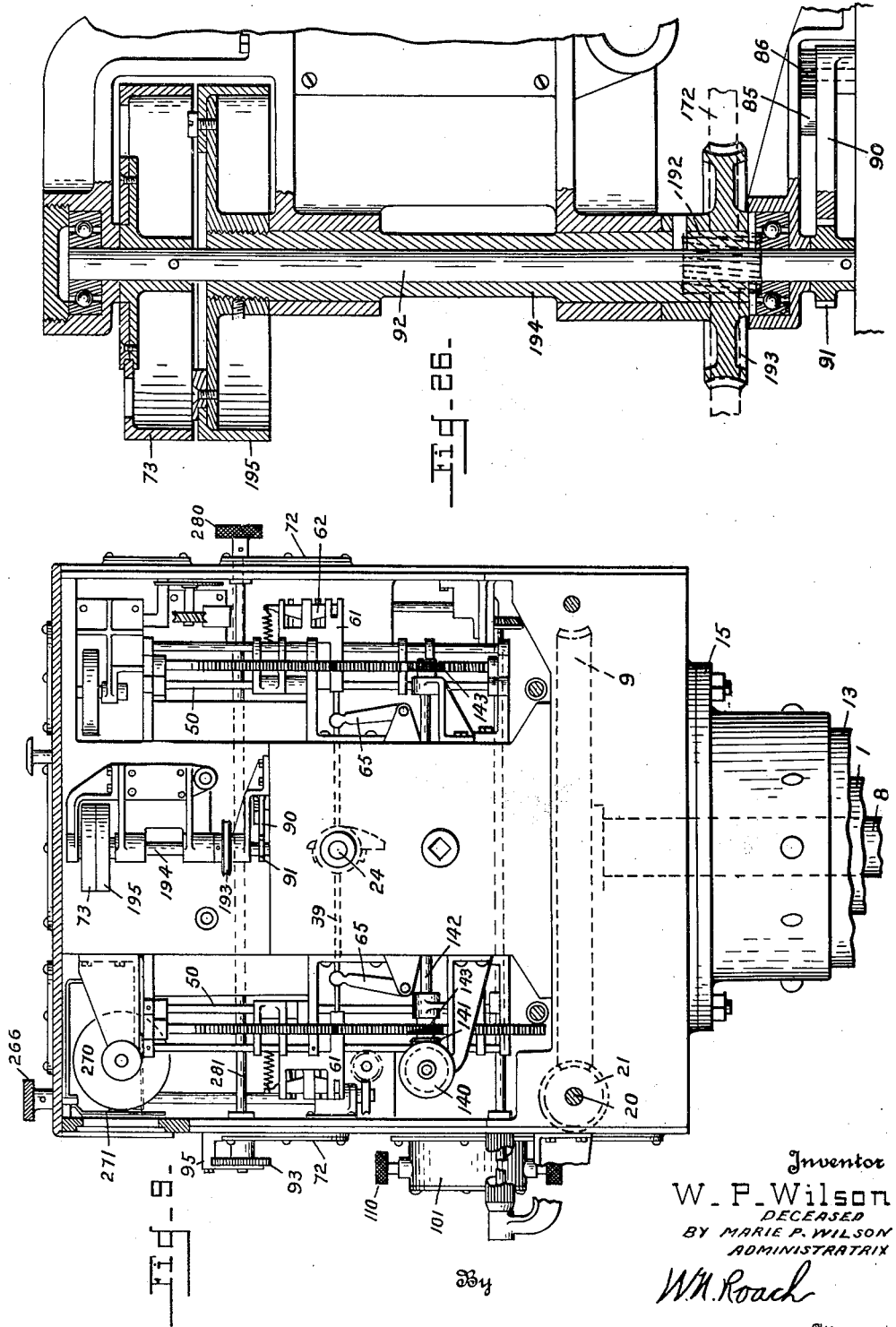
Inventor
W. P. Wilson
DECEASED
BY MARIE P. WILSON
ADMINISTRATRIX
By W. H. Roach
Attorney Nov. 6, 1934.  W. P. WILSON  1,979,720
DIRECTOR
Filed Jan. 20, 1930  15 Sheets-Sheet 8
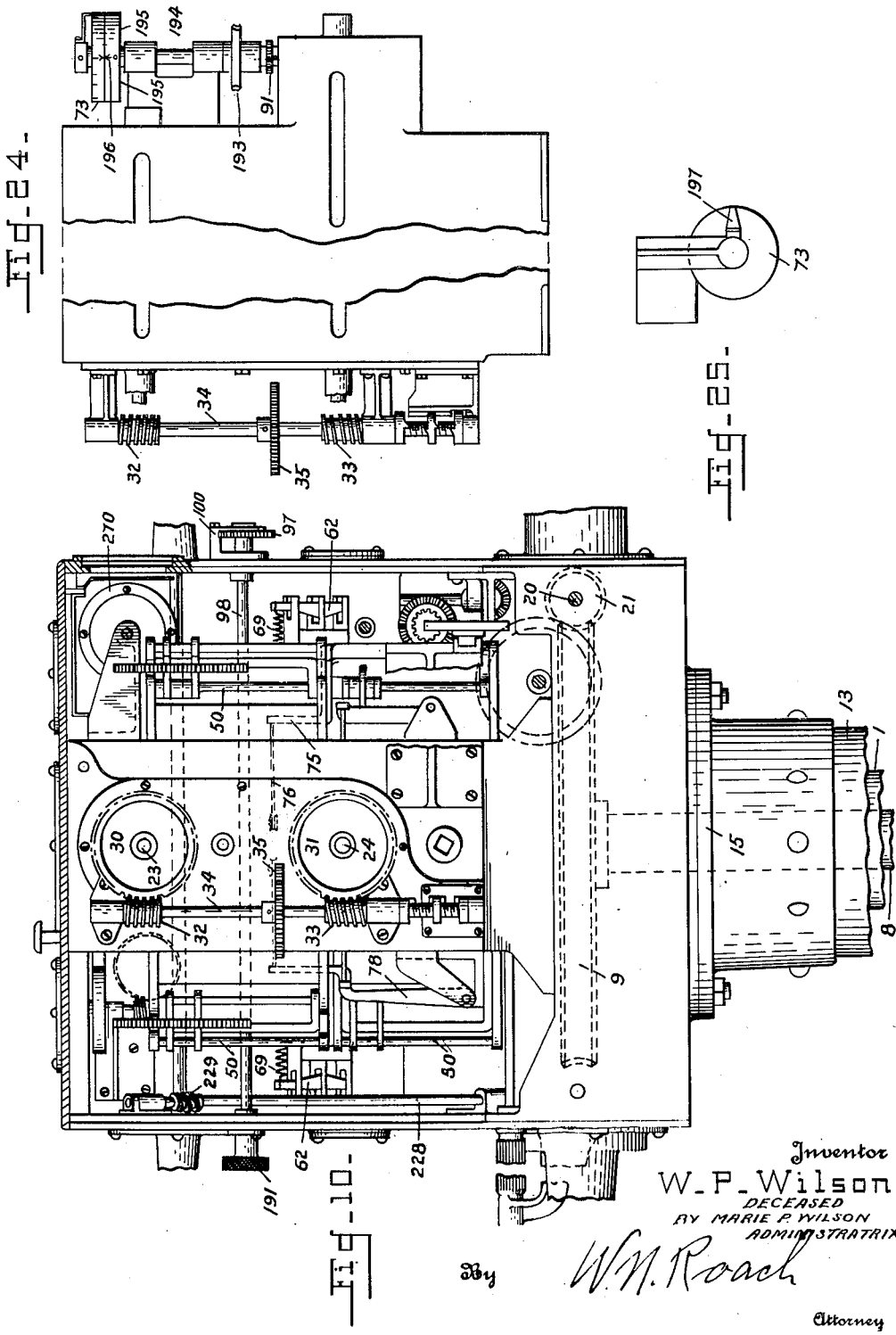

Nov. 6, 1934.    W. P. WILSON    1,979,720
DIRECTOR
Filed Jan. 20, 1930    15 Sheets-Sheet 9
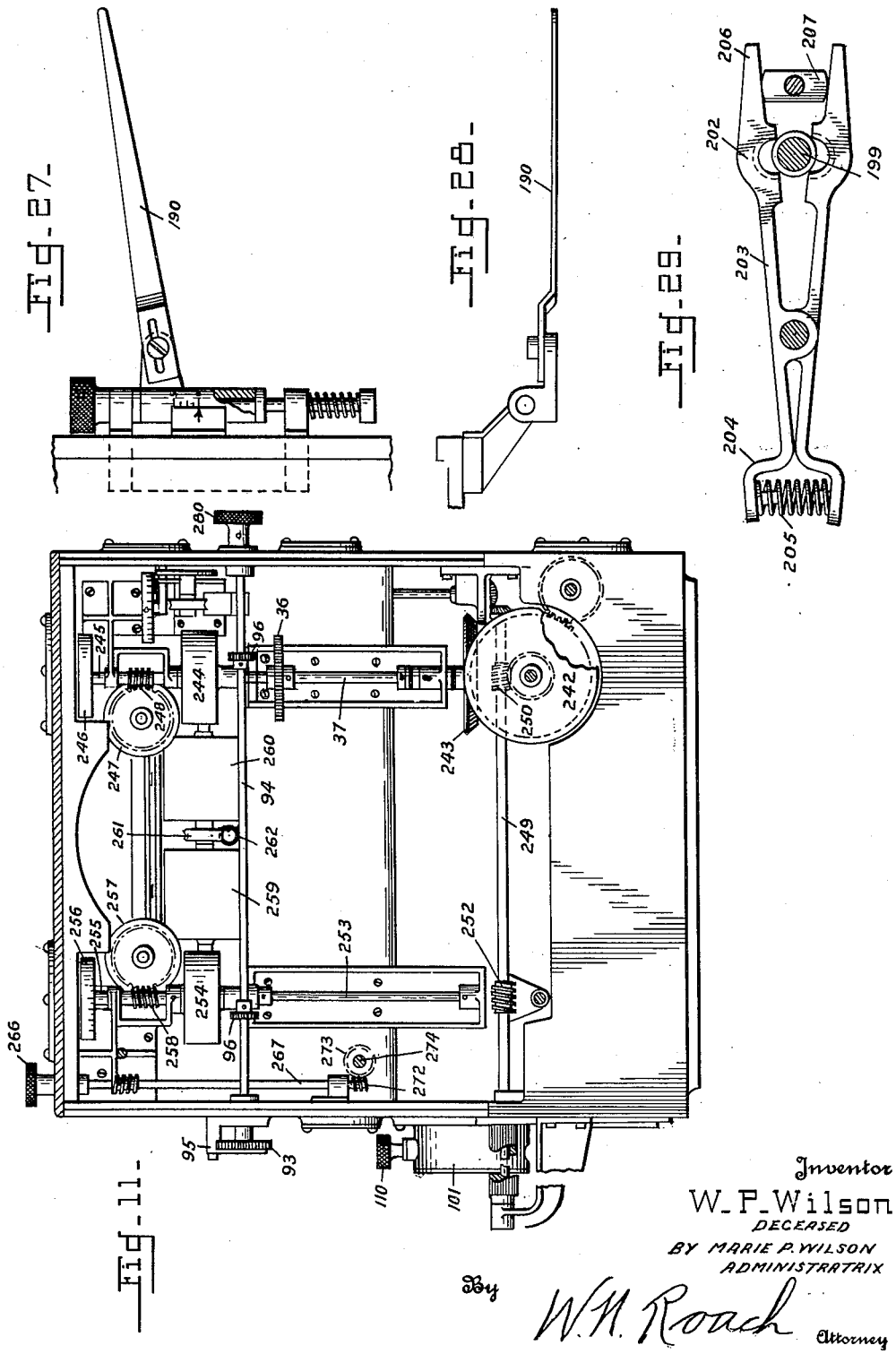
Inventor
W. P. Wilson
DECEASED
BY MARIE P. WILSON
ADMINISTRATRIX
By W. H. Roach
Attorney Nov. 6, 1934.     W. P. WILSON     1,979,720
DIRECTOR
Filed Jan. 20, 1930     15 Sheets-Sheet 10
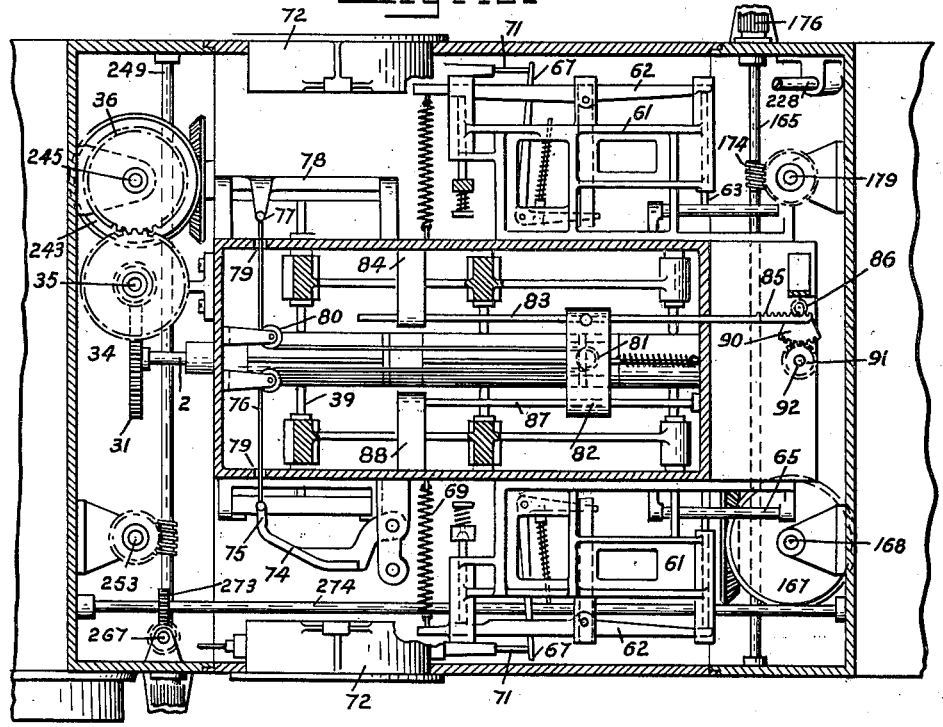
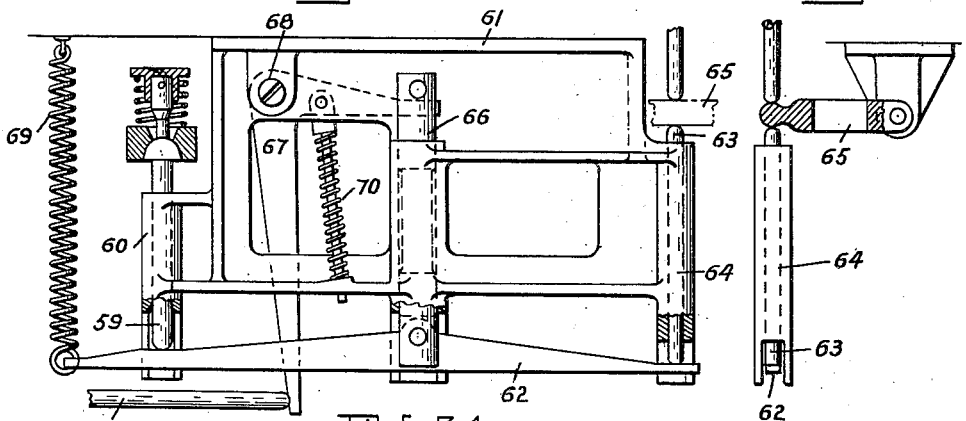
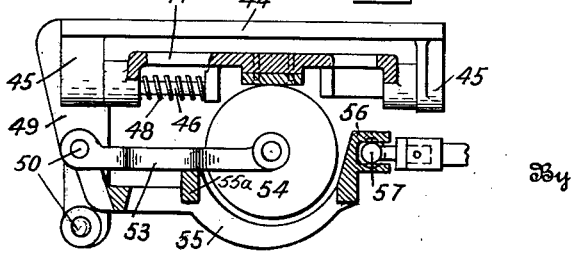
Inventor
W. P. Wilson
DECEASED
BY MARIE P. WILSON
ADMINISTRATRIX
By W. N. Roach
Attorney

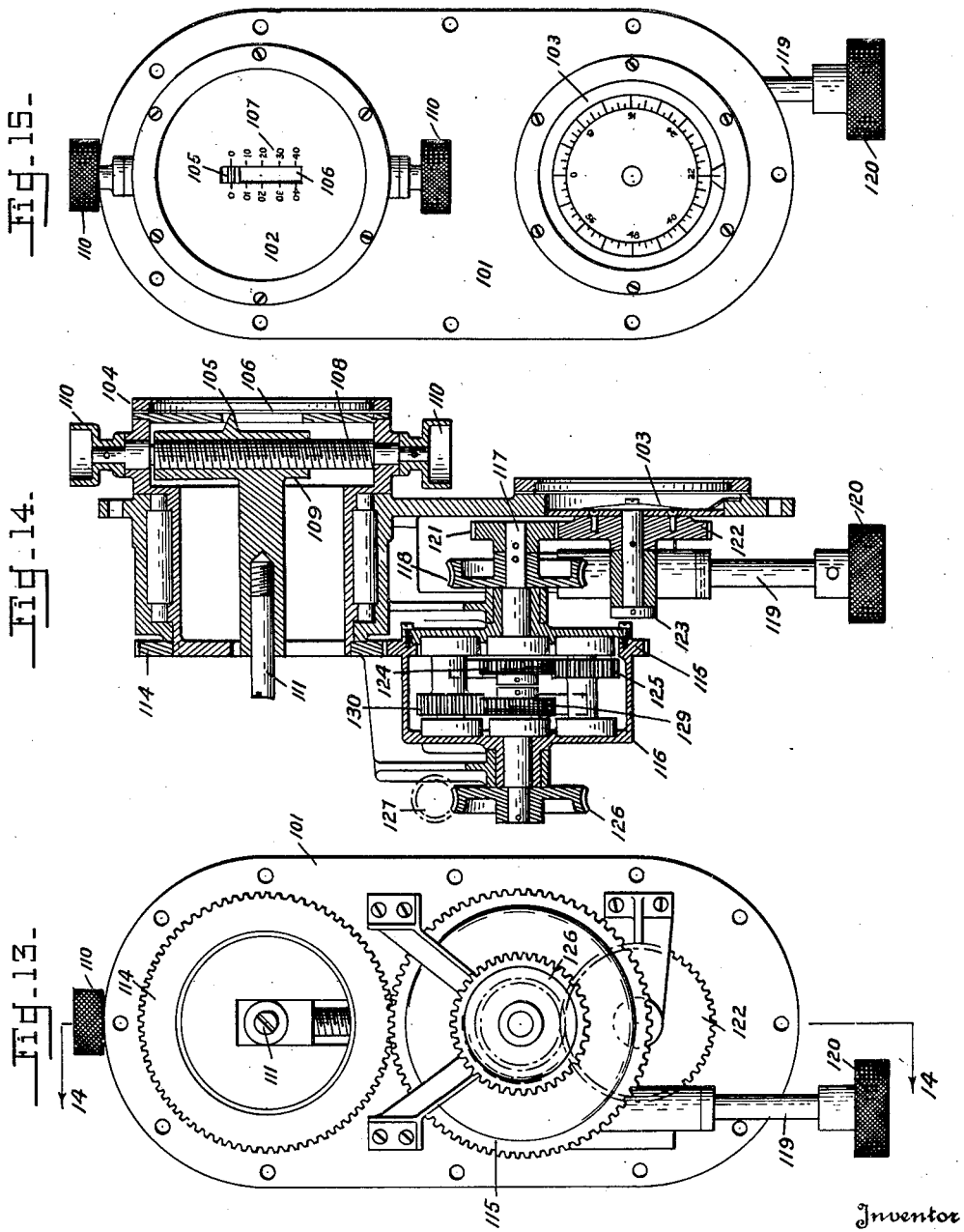

Nov. 6, 1934. W. P. WILSON 1,979,720
DIRECTOR
Filed Jan. 20, 1930 15 Sheets-Sheet 12
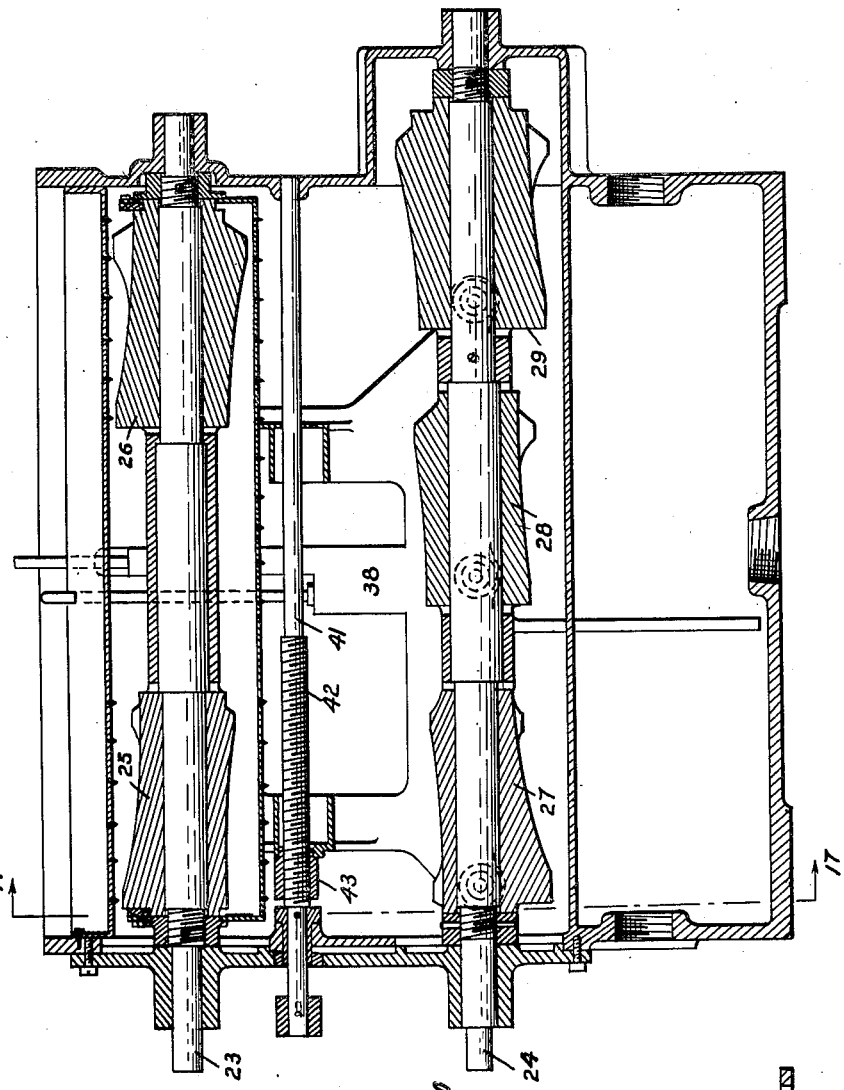
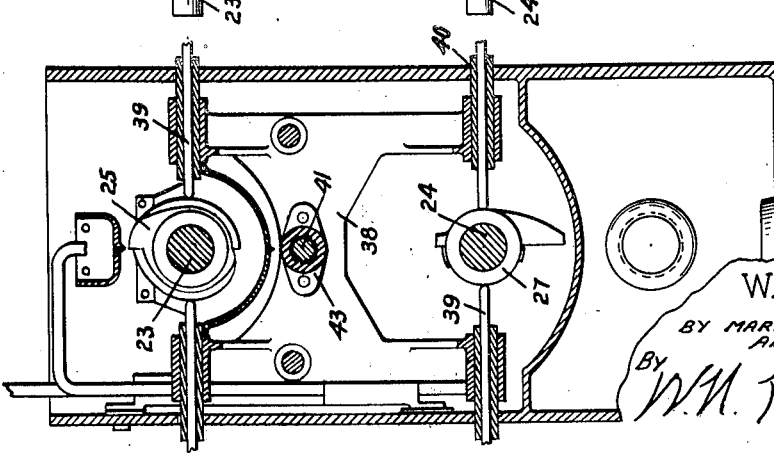

Nov. 6, 1934.     W. P. WILSON     1,979,720
DIRECTOR
Filed Jan. 20, 1930     15 Sheets-Sheet 13

Inventor
W. P. Wilson
DECEASED
BY MARIE P. WILSON
ADMINISTRATRIX
W. M. Roach
Attorney Nov. 6, 1934.  W. P. WILSON  1,979,720
DIRECTOR
Filed Jan. 20, 1930  15 Sheets-Sheet 14
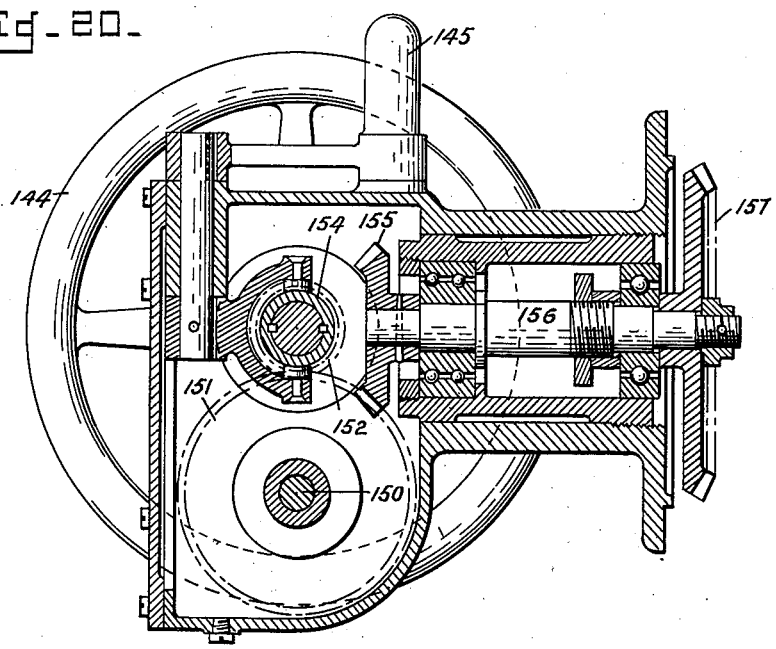
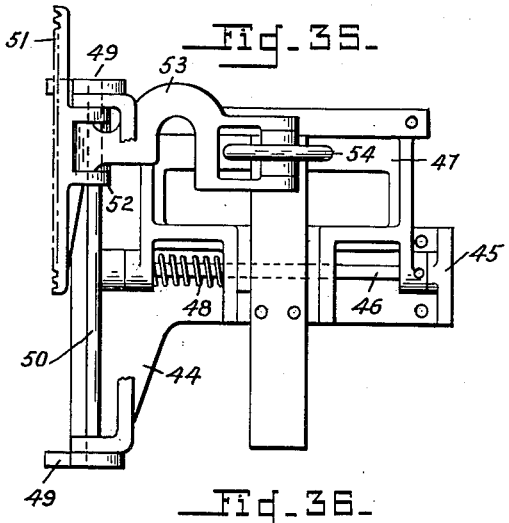
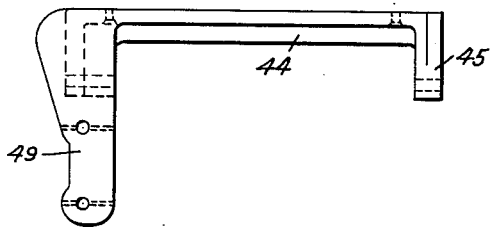
Inventor
W. P. Wilson
DECEASED
BY MARIE P. WILSON
ADMINISTRATRIX
Attorney

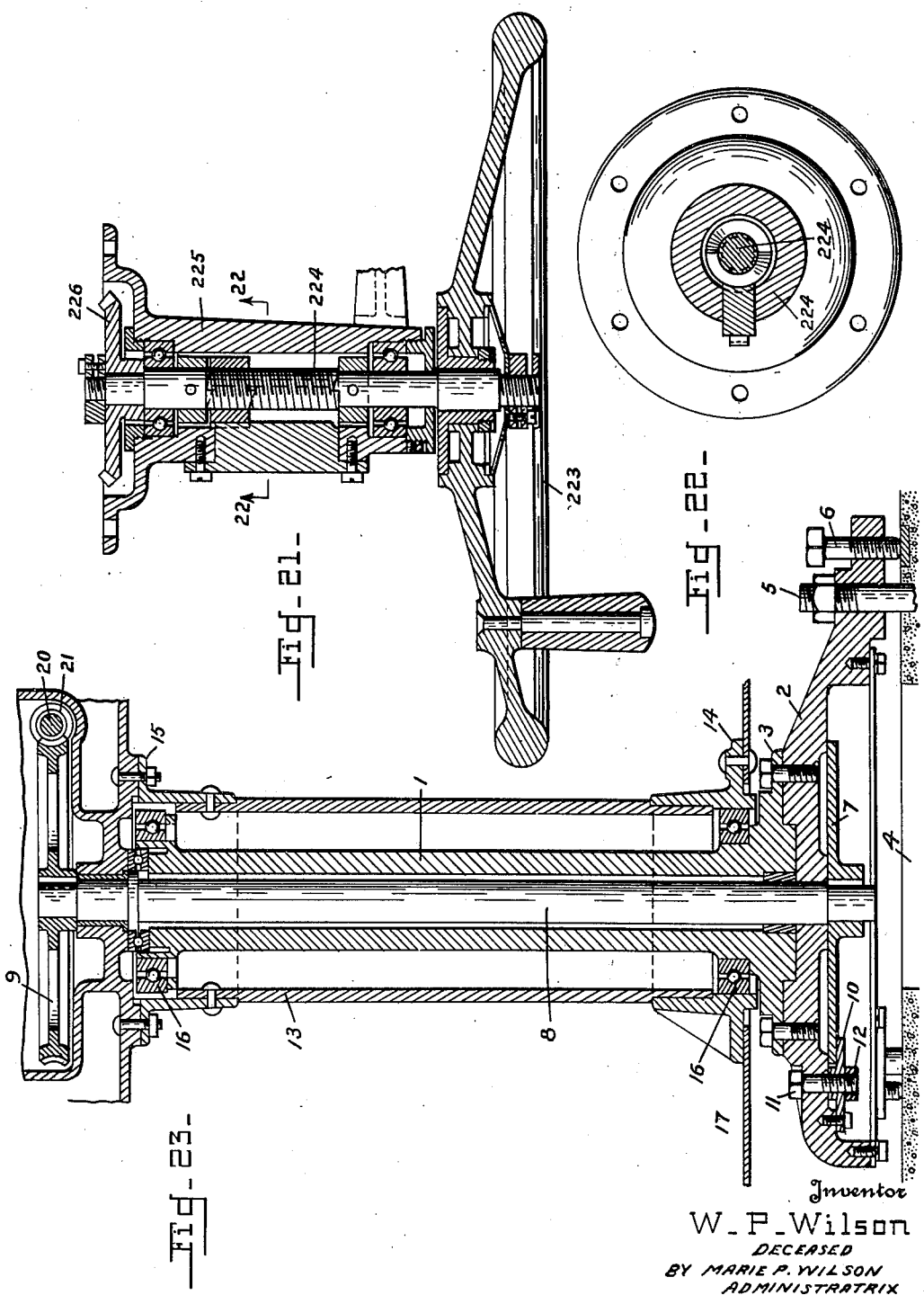

Patented Nov. 6, 1934

1,979,720

UNITED STATES PATENT OFFICE 1,979,720

DIRECTOR

William P. Wilson, deceased, late of Detroit, Mich., by Marie P. Wilson, administratrix, Lansing, Mich., assignor to Sperry Gyroscope Company, Inc., Brooklyn, N. Y., a corporation of New York Application January 20, 1930, Serial No. 422,209

6 Claims. (Cl. 235—61.5)

This invention relates to a director intended for directing gun fire upon a given target and finds especial application in the direction of gun fire upon moving targets, more especially aircraft.

The main objects of the invention are the provision of an instrument of this character which will determine and render available ballistically corrected gun-laying data for firing at the point in space which it is predicted the target will occupy a given number of seconds after the instant of observation. This time interval between the instant of observation and the passage of the projectile through the selected point is referred to as the predicting interval and the point as the predicted point.

The provision of such an instrument which will determine and render available gun-laying data necessary for directing fire upon such a target by either direct or indirect fire methods or by a combination of both. In the direct fire method of gun-laying, the line passing through the gun sight and the target is the line of reference, the axis of the bore being suitably positioned with reference to the line of sight by the application of vertical and lateral deflections. In the indirect method of fire, the gun is laid with reference to a horizontal plane by means of some form of quadrant, and with reference to a selected vertical plane, or origin of reference, by means of a suitable azimuth circle. The gun may be laid by a combination of the two methods by utilizing the quadrant as a means of laying for elevation and the vertical plane of the gun sight as a means of laying for direction.

The provision of an instrument which combines the features of an observation instrument with those of a data computer.

The provision of an instrument which when used to observe continuously a moving target, gives continuously and instantly appropriate values of data for gun laying and fuse setting.

The provision of an instrument into which known data, such as the ballistic coefficient and muzzle velocity may be initially set.

The provision in such an instrument of means for automatically correcting for direction and velocity of the wind.

The provision of an instrument which takes into consideration changes in the rate of change in contradistinction to those instruments which involve multiplying the present rate of change by the time of flight.

The provision of an instrument in which the predictor operators perform a tracking or tracing operation rather than the reading of numerical values.

The provision of an instrument in which a record is produced of the prediction errors.

The invention permits of using the measured altitude of an aerial target and the measured slant range of a ground, or floating, target as an argument in defining the location of the target.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is shown by way of illustration in the drawings, wherein:

Fig. 2 is a right side elevation, the pedestal broken away;

Fig. 3 is a plan view;

Fig. 4 is a rear end elevation;

Fig. 5 is a front elevation;

Fig. 6 is a right side elevation, the side plates cut away and the pedestal broken away;

Fig. 7 is a similar view of the left side;

Fig. 8 is a section on the line 8—8 of Fig. 6;

Fig. 9 is a section on the line 9—9 of Fig. 6;

Fig. 10 is a section on the line 10—10 of Fig. 6;

Fig. 11 is a section on the line 11—11 of Fig. 6;

Fig. 12 is a section on the line 12—12 of Fig. 6;

Fig. 13 is a detail view in rear elevation of the wind component resolving instrument;

Fig. 14 is a section on the line 14—14 of Fig. 13;

Fig. 15 is a front elevation of the wind component resolving instrument;

Fig. 16 is a detail vertical sectional view of the correction cams and their mounting;

Fig. 17 is a section on the line 17—17 of Fig. 16;

Fig. 20 is a section on the line 20—20 of Fig. 19;

Fig. 21 is a section on the line 21—21 of Fig. 4;

Fig. 22 is a section on the line 22—22 of Fig. 21;

Fig. 23 is a vertical sectional view of the pedestal;

Fig. 24 is a view in right side elevation of the device the casing and ends removed and parts broken away;

Fig. 25 is a plan view of drift indicator;

Fig. 26 is a section on the line 26—26 of Fig. 24;

Fig. 27 is a plan view of the fixed stylus;

Fig. 28 is an elevation of the same;

Fig. 29 is a view in side elevation of the split nut;

Fig. 30 is a plan view of the record carriage;

Fig. 31 is a view in front elevation of movable stylus;

Fig. 32 is a detail plan view, parts in section, of the bracket and output correction lever;

Fig. 33 is an end elevation of same;

Fig. 34 is a plan view, partly in section, of the multiplying lever;

Fig. 35 is an elevation of same;

Fig. 36 is a detail plan view of the bracket for same.

Figure 1:
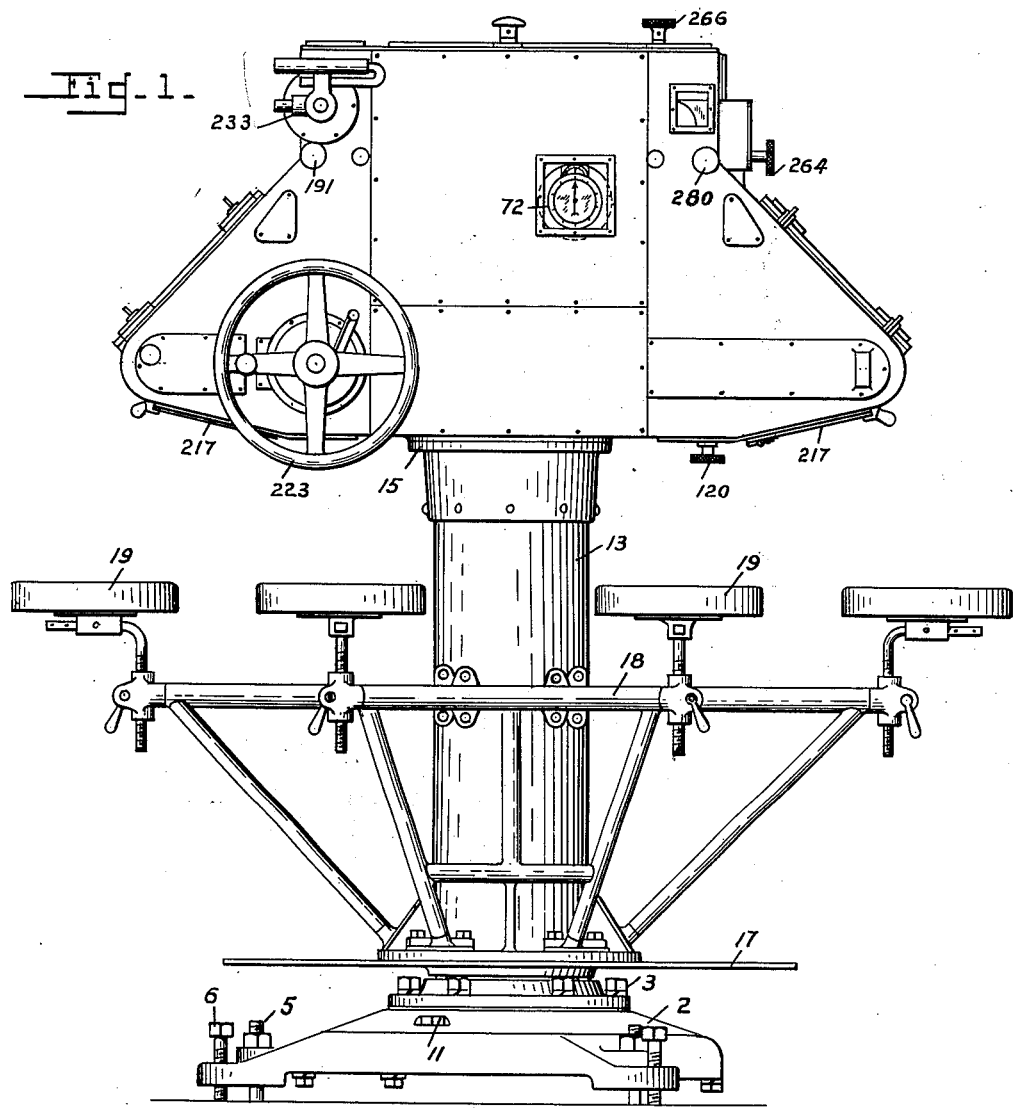
Fig. 1 is a view in left side elevation of a device constructed in accordance with the invention.
Figure 18:
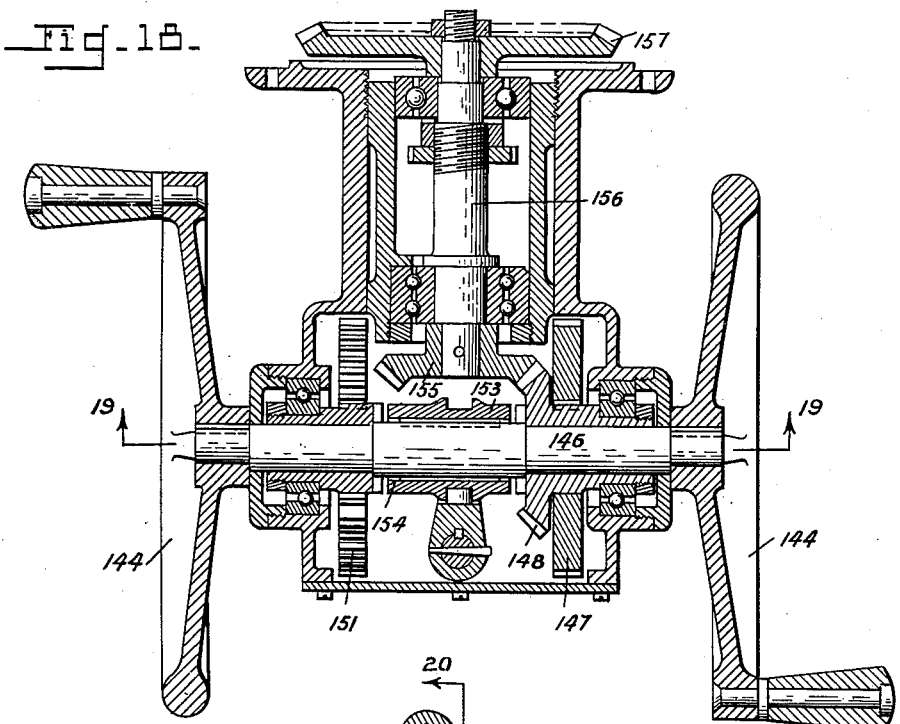
Fig. 18 is a section on the line 18—18 of Fig. 4.
Figure 19:
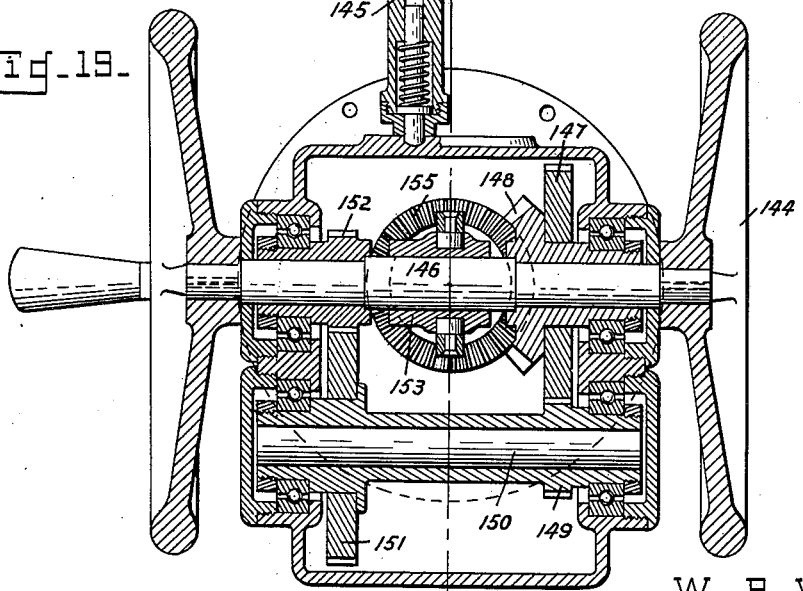
Fig. 19 is a section on the line 19—19 of Fig. 18.

In devices of this character it is desirable that proper provision be made for adjusting, levelling and orienting the instrument. The instrument is, therefore, mounted on a suitable support, a convenient form of which is shown herein by way of illustration, as follows:

A pedestal is provided (see Figs. 1 and 23) consisting of a hollow column 1 stepped in a base plate 2, to which it is secured by any suitable means as, for instance, the bolts 3. The base plate may, as herein illustrated, be supported on a foundation 4 to which it is secured, conveniently by anchor bolts 5.

Means for levelling the base plate to level the instrument may consist of bolts 6 threaded through the base plate and contacting the foundation.

A clamping member, as for instance the plate 7, preferably circular, is secured on the lower end of a shaft 8 which extends through the hollow column 1 and on the upper end of this shaft is mounted the main azimuth worm wheel 9 which is housed in the casing of the instrument. The clamping plate 7 may be clamped in place, after the instrument has been oriented, by clamping lugs 10 which engage the lower face of the plate and force the plate against the lower face of the base plate, being moved to clamping and unclamping positions through the instrumentality of bolts 11 which pass through the base plate and are threaded through the clamping lugs. These bolts are, preferably, provided with retaining collars 12 on their lower ends to prevent the lugs from being unscrewed from the bolts and dropping off. Surrounding the column is a hollow casing 13, which may be formed with terminal annular flanges 14 and 15, respectively, and which is supported on the column by anti-friction bearings 16—16 so as to be free to rotate thereon. To the lower annular flange is secured a platform 17 while to the walls of the casing are secured the brackets 18 supporting seats 19 for the operators of the director. To the annular flange 15 is secured the instrument proper.

The director instrument consists of a casing which is suitably affixed to the rotatable portion of the pedestal and houses in its lower portion the main azimuth worm wheel 9. Journalled in the right hand side of the casing, near the bottom thereof (see Fig. 6) is a shaft 20 carrying the azimuth worm 21 which meshes with the azimuth worm wheel and is operable to traverse the instrument.

Within the central well or compartment 22 of the casing (see Figs. 16 and 17) two horizontal shafts 23—24 are mounted, being journalled in the end walls of such well and preferably positioned one above the other. Upon these shafts are rigidly secured cams, herein shown as two on the upper shaft 23 and three on the lower shaft 24.

Of the cams on the upper shaft the rear cam 25 is a correction cam designed to give simultaneously elevation and time corrections for a selected departure of the velocity from normal muzzle velocity.

The forward cam 26 on the upper shaft is a correction cam designed to give simultaneously corrections in elevation and time for a selected departure of the ballistic coefficient from the normal ballistic coefficient. The ballistic coefficient, as may be found in any work on exterior ballistics, is expressed by the equation $$C = \frac{fw}{\beta \delta c d^2}$$

in which C stands for the ballistic coefficient: $f$ the altitude factor; $w$ the weight of the projectile in pounds; $d$ the diameter of the projectile in inches; $c$ coefficient of form of the projectile; $\beta$ intergration factor; and $\delta$ density of the air at time of firing.

The rearmost cam 27 on the lower shaft is a lateral deflection cam from which deflection corrections for drift and a wind blowing from left to right of a chosen maximum velocity are to be computed.

The central cam 28 on the lower shaft is a correction cam designed to give simultaneously elevation and time of flight corrections for a head wind of a selected maximum velocity.

The forward lower cam 29, termed the normal cam, is designed to give simultaneously superelevation, and time of flight for normal range table conditions.

The lift of the various cams is proportionate to superelevation, time of flight, and lateral deflection respectively.

In the case of the normal cam 29 the lift of one side of the cam is proportionate to superelevation and that on the other side to time of flight. In the case of the three correction cams, the same remarks apply.

In the case of the lateral cam the lift on both sides of the cam is proportional to lateral deflection. With this cam the lateral deflection is equal to the lift of the drift side of the cam plus the lift on the lateral wind side of the cam multiplied by a factor between plus 1 and minus 1. This factor is introduced through the functioning of the wind component resolving mechanism and multiplying device hereinafter described.

Mounted on the protruding rear ends of the cam shafts (see Fig. 10) are respective worm wheels 30—31 meshing with their respective worms 32—33 on a jack shaft 34 (see Fig. 24) and on this shaft is a spur gear 35 meshing with a spur gear 36 on a vertical shaft 37 through the instrumentality of which the cam shafts are given angular movement, as will be hereinafter described.

Within the central well is mounted for rectilinear movement longitudinally thereof, a carriage 38 carrying followers 39 the inner ends of which rest on the respective cams and the outer ends of which protrude through slots 40 formed in the side walls of the well.

The carriage is moved longitudinally of the well through means of a shaft 41 journaled in the front and rear walls of the well and formed with a threaded portion 42 meshing with the threads of a nut 43 secured in the carriage. Rotation of this shaft and consequent displacement of the carriage is had when altitude or slant range is set into the instrument, as will be described hereinafter.

It will be evident from the foregoing that the plungers are moved by their respective cams and they in turn impart movement to levers which, through suitable mechanisms, convey movement to indicators on the instrument. As the multiplying levers for the three correction cams are identical only one set of such levers need be described. These levers are the ones associated with the upper cams and the central lower cam.

Also since the mechanism on the time side of the instrument is a duplicate of that on the elevation side only one side will be described.

Mounted on the outer face of the side wall of the well (see Figs. 6, 7, 34, 35 and 36) is a bracket 44 provided at its ends with the outwardly extending arms 45 apertured for the reception of a pin 46 through the instrumentality of which a lever plate 47 is pivotally mounted. The upper edge of the lever plate lies over a slot 40 so as to be contacted by the outer end of a follower 39. The lever plate extends below its pivotal axis and may be held in contact with the follower or plunger by suitable means, as for instance, a torsion spring 48. The bracket may also be formed at one side thereof, with spaced arms 49—49 apertured to receive the ends of spaced parallel rods 50—50. Upon the rods 50 is slidably mounted a rack 51 being provided with spaced apertured ears 52—52 for this purpose. Pivotally and slidably mounted on the outermost of the rods 50 its pivoted end being embraced by the ears 52 is an arm 53 at the free end of which is provided a contact member 54 adapted to normally rest against the outer face of the lever plate 47. Also pivotally but not slidably mounted on one of the rods 50 is a lever 55 adapted to be contacted by that face of the arm 53 remote from the lever plate 47 in any position of said arm the lever or a portion 55a thereof being of sufficient extent to permit such contact. The free end of the lever 55 is provided with one element of a universal joint, herein shown as a socket 56 adapted to receive a ball 57. The sockets of the elements of the three multiplying levers are so situated that they are equi-distant from each other, that is, the balls which they receive would be situated at the apices of an equilateral triangle (see Figs. 6 and 7). The three balls heretofore mentioned are mounted on a T-shaped element 58 which floats between the three levers and upon the leg of which rests one end of a plunger or follower 59, the point at which the follower contacts the leg being the point of center of the equilateral triangle. It will, therefore, be seen that the follower will be given a displacement proportional to the displacement of the three balls, that is, the lift will be one-third the sum of the lifts of the three balls.

Since each of the three levers, the construction of which has just been considered, is associated with and operated by a respective correction cam, it follows that one of the levers on the elevation side of the instrument has been given a movement proportional to elevation corrections for a selected departure of the velocity from normal muzzle velocity, while the corresponding lever on the time side has been given a movement proportional to time corrections for a selected departure of the velocity from normal muzzle velocity. Another of the levers on the elevation side has been given a movement proportional to corrections in elevation, while the corresponding lever on the time side has been given a movement proportional to corrections in time for a selected departure of the ballistic coefficient from the normal ballistic coefficient. The third and last lever on the elevation side has been given a movement proportional to elevation corrections, and the corresponding lever on the time side has been given a movement proportional to time of flight corrections for a head wind of selected maximum velocity. From this it is evident that the plunger or follower 59 on the elevation side on the one hand and on the time side on the other hand has been given a movement proportional to the sum of the movements of the levers of the respective sides.

The follower 59 (see Figs. 6, 7, 32 and 33) is supported in a socket 60 formed in a bracket 61 secured to the side of the central well and its outer end is in engagement with one end of a lever 62 the other end of which lever is in engagement with a follower 63 working in socket 64 formed in the bracket, the other end of which follower is in contact with the rocker 65 operated by the follower of the normal cam. The central portion of the lever 62 is in contact with a follower 66 likewise working in a socket formed in the bracket, the other end of which follower has engagement with the end of one arm of a bell crank lever 67, fulcrumed as at 68 in the said bracket. The lever 62 and its followers are retained in contact with their various elements by suitable means such as the coil spring 69, one end of which is anchored to one end of the lever and the other end of which is secured to the side wall of the well, and the compression spring 70, one end of which engages a bar of the bracket and the other end of which is in contact with an arm of the bell crank lever 67. The free end of the other arm of the bell crank lever projects through a slot formed in the bracket and engages the operating rod 71 of an indicator 72 (see Fig. 12) suitably secured to the instrument, whereby movement of the lever is imparted to the indicator to indicate superelevation while a similar mechanism on the opposite or time side of the instrument indicates time of flight.

Having outlined the movement, caused by the correction cams and their followers in conjunction with the normal cam, it remains to consider the lateral deflection cam and the actions produced thereby. This cam, as heretofore stated, has a drift side and a lateral wind side. The lift on both sides of this cam is added algebraically and indicated on an indicator 73 (see Figs. 12, 24, 25 and 26). The lift is taken off by plungers or followers, as hereinbefore described in relation to the correction cams, with the exception that on the wind side only is there a multiple lever similar to those heretofore described as containing the elements 47, 53, 54 and 55. By reason of the varying azimuth of the target, the longitudinal and lateral components of the wind are continually varying so that means must be provided to introduce these variations into the resultant of the lift of the wind side of the cam, and this is done through the instrumentality of the multiplying lever 74. This lever is, in all respects, similar to the lever heretofore described with the exception that its final or output element has an arm 75 extending upwardly therefrom to the end of which arm is secured one end of a flexible member 76, the other end of which is connected to a similar arm 77 on the lever 78 of the drift side. The flexible element passes through openings 79—79 in the side walls of the well and about idlers 80—80 carried in brackets secured to a wall of the well, and thence over an idler 81 mounted in a movable block 82. This block 82 is provided with a rod 83 rigidly connected thereto, the rear end of which rod may reciprocate in a suitable guide bearing 84 secured to a wall of the well, and the forward end of which has a rack 85 formed thereon to mesh with a pinion 86, so that reciprocation of the block imparts a rotary movement to the pinion. In order that the block may be properly held in position during its reciprocatory movement, the other end of the block is apertured to receive a guide rod 87 carried in brackets 88 secured to walls of the well.

The pinion 86 is mounted on a shaft 89 and may be integral with or secured to the same shaft as a segmental gear 90 which gear meshes with a pinion 91 on the lower end of the shaft 92 of the drift indicator 73, which will soon be described.

Having now described the cams and the means through which they either automatically indicate corrections to be set into the instrument, or automatically introduce variations into readings of the instrument, we will consider how those values which are known and fixed are set into the instrument and then the functioning of the instrument upon its operation, first in azimuth and then in elevation.

To introduce known data and more specifically muzzle velocity there is provided a dial 93 (see Figs. 1, 2 and 8) herein shown as located on the right side of the instrument near the rear end thereof, which dial is fixed to the projecting end of a shaft 94 (Figs. 6, 7 and 8) extending transversely of the instrument. This dial may have associated therewith a latch carried by the member 95 by which the dial can be held in any selected position. The shaft 94 has mounted thereon pinions 96—96 which mesh with the respective racks 51 of the multiplying levers of the upper rearmost cam, which, as before stated, is a correction cam designed to give simultaneous elevation and time corrections for a minus 10% change in muzzle velocity from a normal muzzle velocity. As will be readily understood, when the dial 93 is rotated to the desired setting, the racks are displaced, thereby moving the movable contact elements 54 of the multiplying levers to vary the throw of such levers, the variation being that rendered necessary in order to take into account the particular muzzle velocity to which the dial has been set.

The ballistic coefficient dial 97, as herein shown, is located on the right side of the instrument near the front end thereof. This dial is mounted on the protruding end of a transverse shaft 98 on which shaft pinions 99—99 are secured, adapted to mesh with the respective racks of the multiplying levers of the upper forward cam which, as hereinbefore set forth, is a correction cam designed to give simultaneous corrections in elevation and time of flight for a minus 10% variation in the ballistic coefficient from the normal ballistic coefficient.

The dial may be provided with a latch 100 through which it is held at any desired setting. When the dial is rotated to set the same, the shaft 98 and the pinions 99, rotating therewith, displace the respective racks 51, thereby moving the movable contact elements 54 of the multiplying levers to change the throw of said levers to that extent rendered necessary by the particular coefficient set on the dial.

Though direction and velocity of the wind are known, it is evident that the wind components should change with every change in azimuth of the target. It is obvious then, that the components of the wind can not be set into the instrument directly but should be introduced through some instrumentality which will, preferably automatically, take into consideration the changes in azimuth of the target and apply to the instrument the corrections rendered necessary by such changes.

The preferred form of the device for this purpose (Figs. 13, 14 and 15), herein disclosed by way of illustration, and which is termed a wind component resolving instrument, may consist of a casing 101 in the face of which two dials 102—103, respectively, are provided. The upper dial 102 is carried in a subsidiary casing 104 rotatably mounted in the main casing.

The upper dial is provided with a pointer 105 extending through a slot 106 in the dial and readable against graduations 107 engraved on the dial adjacent the slot, such graduations being in terms of wind velocity. The pointer is moved to the desired setting in any convenient manner but, as herein shown, a shaft 108 extends diametrically of the casing and is threaded through an internally threaded sleeve 109 on which the pointer is formed. On each end of the shaft thumb wheels 110 may be mounted to facilitate rotation of the shaft when it is desired to set the pointer. Integral with or otherwise associated with the sleeve to move in unison therewith is a stud 111 which assumes, when the pointer is moved from zero setting, a position eccentric of the casing 104. The free end of this stud has a close turning fit in the aperture of a block 112 (Fig. 6) which is mounted to slide in a yoke 113 for a purpose soon to be described.

The casing 104 is provided with a gear 114 which meshes with a gear 115 carried by a differential housing 116 concentric with a divided counter-shaft 117, the forward portion of which shaft has mounted thereon a worm wheel 118 meshing with a worm on a shaft 119 provided with a thumb wheel 120 through manipulation of which the shaft may be rotated. On the forward end of the counter-shaft 117 is a pinion 121 meshing with a gear 122 preferably concentric with the dial 103 both of which may be conveniently mounted on a stub shaft 123 suitably journalled in the casing. On the rear end of the forward portion of the counter-shaft 117, and within the differential casing, is a pinion 124 which meshes with pinions 125 journaled in the differential housing, so that rotation of the forward portion of the shaft 117 will impart angular displacement to the housing. The rearward portion of the counter-shaft has mounted on its rear end a worm wheel 126 meshing with a worm 127 carried on a shaft 128 which extends longitudinally of the instrument and is geared to the azimuth drive thereof to be rotated thereby. Also mounted on the rearward portion of the counter-shaft, at the forward end thereof, is a pinion 129 which is located within the differential casing and meshes with pinions 130 journalled in the housing, so that rotation of this portion of the counter-shaft imparts angular displacement to the housing. From this it will be seen that for each change in setting for direction of wind the special casing carrying the direction of wind pointer is displaced angularly and is also given an angular displacement for each change in azimuth of the instrument in following a target.

The movements which have just been described are made use of in the following manner:

The stud 111, as before stated, has a close fit in the aperture of a block 112 sliding in a yoke 113 which yoke is formed on and transversely of the rear end of the shaft 131 extending longitudinally of the right side of the instrument. This shaft carries, near its forward end, a rack 132 which meshes with a pinion 133 mounted on the end of a transverse shaft 134 on which end is secured a pinion 135 meshing with the rack of the movable contact element of the multiplying lever of the rear lower cam which is the lateral deflection cam. It will be evident then, as the said casing 104 is rotated, with the indicator or pointer 105 set at other than zero, the shaft 131 will be reciprocated thereby rotating the shaft 134 and setting the movable contact element so as to change the throw of the multiplying lever.

The block 112 also has a sliding fit in a groove formed in the angularly disposed end 136 of a rack 137 which meshes with a pinion 138 on the rear end of a shaft 139 which shaft extends longitudinally of the instrument at the right hand side thereof and on the forward end of which is a beveled gear 140 meshing with a bevel pinion 141 (Fig. 9) on the right hand end of a transverse shaft 142 on which shaft are pinions 143 meshing respectively with the racks 51 of the movable contact elements of the multiplying levers of the lower central cam, which gives simultaneous elevation and time of flight corrections for a head wind of 60 feet per second velocity.

From the foregoing it is evident that if the sub-casing 104 be rotated with the indicator 105 at other than zero setting the contact elements of the multiplying levers will be shifted to vary the throw of such levers.

Having now described the various instrumentalities through which corrections and known data are introduced it remains to consider the various operating parts by which the instrument is moved in azimuth and elevation in following a target, the effect, if any, of this movement on the parts heretofore considered and the instrumentalities through which the results are conveyed to the personnel.

Secured to the right hand side of the instrument near the forward end thereof is a casing in which is journalled the shaft of the traversing hand wheels 144 (Figs. 2 to 5 and 18—20) and which houses a gearing adapted for fast or slow motion, a lever 145 being provided on the casing through which the gearing may be changed to either style of movement or to release.

The preferred form of this structure, as shown herein, consists of a shaft 146 on which the traversing hand wheels 144 are mounted. Loose on this shaft, adjacent one end thereof, is a spur gear 147 and bevel gear 148. The spur gear meshes with a pinion 149 fast on a counter-shaft 150 journalled in the casing and having fast thereon a spur gear 151 meshing with a pinion 152 loose on the other end of the shaft 146. Feathered on the shaft 146 between the bevel gear 148 and pinion 152 is a clutch member 153 having on each end a clutch element 154 respectively adapted to engage the clutch elements formed on the pinion and beveled gear. The bevel gear 148 meshes with a bevel gear 155 fast on one end of a shaft 156, the other end of which shaft projects beyond the casing and has secured on its extending end a bevel gear 157 which, when the casing is in position on the instrument, is located within the instrument and meshes with a bevel gear 158 fast on the main azimuth shaft 20 of the instrument.

It is evident then that when the lever is thrown to shift the clutch member 153 into engagement with the pinion 152 drive will be had through such pinion, spur gear 151 on the counter shaft, pinion 149, spur gear 147, bevel gear 148, bevel gear 155, shaft 156, bevel gear 157, to the azimuth shaft 20, thus securing slow motion; while, when the clutch element is thrown to the opposite end of its travel it will engage bevel gear 148 and through it drive bevel gear 155, shaft 156, bevel gear 157, and main azimuth shaft. If the clutch member 153 is in mid position no drive whatever will be had from manipulation of the hand wheels.

Upon manipulation of the hand wheels 144 to cause rotation of the shaft 156, the bevel gear 157 meshing with the bevel gear 158 (see Fig. 6) on the main azimuth worm shaft 20 causes rotation of such shaft and with it azimuth worm 21 which meshes with the azimuth worm wheel 9 thereby rotating the instrument and the rotatable outer casing of the pedestal. Fast on the azimuth shaft 20, adjacent the bevel gear 158, is a spur gear 159 which meshes with spur gear 160 carried on a stub shaft 161 projecting forwardly of a differential housing 162. Mounted on the rear side of this housing is a worm wheel 163 (see Figs. 6 and 8) meshing with a worm 164 on a shaft 165 extending transversely of the instrument. Extending rearwardly from the housing is the shaft 128, the worm 127 on the rear end of which meshes with the worm wheel 126 of the wind component instrument. Also mounted on this shaft 128 adjacent the differential housing 162 is a bevel gear 166 which meshes with a bevel gear 167 fast on the lower end of a vertical shaft 168 suitably journaled in brackets on the forward end of the casing.

From the foregoing it will be seen that the vertical shaft will be rotated as the instrument is moved in azimuth in proportion to the true azimuth setting of the instrument as long as the differential casing 162 remains at zero setting and will be moved to predicted future azimuth when the differential casing is rotated through the worm 164 and worm wheel 163 to set in such corrections. This vertical shaft extends into a differential housing 169 on which is formed a worm wheel 170 meshing with a worm 171 carried on a shaft 172 extending transversely of the instrument. Extending from the top of this housing is a worm shaft on which is mounted a dial 173 which may be read through a window 174 in the upper right hand corner of the front of the instrument. Rotation of this differential housing 169 through rotation of the worm 171 introduces into the azimuth reading the correction made necessary by reason of wind and drift. The dial 173 is preferably graduated in mils, while a worm driven tally dial 175 (Figs. 5 and 8) indicates hundreds of mils. To rotate the differential housing 162 through rotation of the worm 164 the shaft 165 protrudes from the left hand side of the instrument and is provided with means, such as the knurled roller 176, whereby an operator may rotate the shaft 165. Fast on this shaft adjacent the left side of the instrument, is a worm 177 meshing with a worm wheel 178 (see Fig. 7) on the lower end of a second vertical shaft 179, which is suitably journalled in brackets secured to a wall of the instrument casing, the upper end of which shaft extends into a differential housing 180 (Figs. 7 and 8). This housing has formed thereon, at the lower end thereof, a worm wheel 181, meshing with a worm 182 on the before mentioned shaft 172. Extending upwardly from the differential housing 180 is a stub shaft 183 carrying on its upper end a dial 184 graduated to give lateral deflection readings. A tally dial 185 (Figs. 5 and 8) is also associated with this dial graduated to give fractional readings, the tally dial being worm driven as indicated most clearly in Fig. 8.

On the right hand end of the shaft 165 (Fig. 8) is a beveled gear 186 which meshes with a similar gear on the lower end of an inclined shaft 187, the upper end of which shaft is geared to a transverse screw shaft 188 (see Fig. 30) the threads on which mesh with threads cut in an aperture formed in the body of a movable marker 189 which the operator endeavors to set in such a position that it will leave a trace which will subsequently be traced over by the fixed stylus 190, as will be more fully hereinafter described.

The shaft 172 protrudes through the left side of the instrument and has mounted thereon a thumb wheel 191 through manipulation of which the shaft is rotated. This shaft has rigid thereon, about its center portion, a worm 192 meshing with a worm wheel 193 (Figs. 9 and 26) on the lower end of a hollow vertical shaft 194 on the upper end of which is a dial 195 carrying a reference mark 196 (Fig. 24) displacement of which is proportionate to the angular rotation of the shaft 172 caused by turning the control knob. The displacement of this pointer is used as a measure of the correction introduced because of the combined effect of wind and drift. Within this hollow shaft, and coincident with its vertical axis of rotation is the shaft 92 (Fig. 26) on the upper end of which is mounted the graduated dial 73, the graduations indicated, by means of a pointer 197, (Fig. 25) suitably placed above the dial, the amount of lateral deflection which should be introduced to correct for wind and drift. The normal line or zero graduation of this dial is extended downwardly across the dial. In order to introduce the proper wind and drift deflection correction the control knob is rotated until the index 196 of the lower dial coincides with the downwardly extending graduation line of the upper dial. On the lower end of the shaft 92 is the pinion 91 hereinbefore referred to through which the shaft is rotated to set the dial to the proper degree.

In order that the operator, who is manipulating the knurled roller 176 (Figs 5 and 12) to set in proper corrections to the azimuth dial, may be able to perform this function, there is provided, in the front end of the instrument, a carriage 198 mounted to reciprocate therein, being moved transversely of the instrument by a lead screw 199 which is geared to the forward end of the traversing shaft 20 preferably through beveled gears 200 and 201 (Fig. 6).

The threads of the lead screw 199 have engagement with the threads of a split nut 202 (Figs. 6, 7 and 29) which is secured to the record strip carriage 198. The nut 202 is split so that the same may be released from the screw for the purpose of moving the carriage to desired positions. For convenience the split nut is formed in the jaws of a pair of pivotally mounted members 203—203 (Fig. 29), the ends of which are offset as at 204 to confine therebetween a coiled spring 205 which tends to keep the nut in closed position, while their other ends are spaced as at 206 to receive the respective cam bars 207 journalled in the side walls of the instrument casing and each having on a protruding end a thumb wheel 208 (Figs. 2 and 3) through which the rod may be rocked to open the nut and disengage its threads from the threads of the screw.

This carriage may be of any suitable form, a preferred structure, herein shown, consisting of a frame 209 within which provision is made for mounting a paper roller 210, paper from which is lead over a roller 211 journalled in the upper portion of the frame, thence over the platen 212, over a roller 213 journalled in the frame adjacent the lower edge of the platen, then between such roller and a driven roller 214 also journalled in the frame, from whence it may be led through a suitable slot 215, over a guide rod 216, and so out of the instrument, a door 217 being provided in the instrument casing to permit egress of the paper strip.

The driven roller 214 has fast thereon a gear 218 meshing with a gear 219 formed on the shaft 220 which shaft is driven by being geared to a shaft 221 which extends longitudinally of the instrument and is driven by a constant speed motor 222 (Fig. 8).

From the foregoing it is evident that the movable marker 189 will leave on the paper strip moving at a constant speed a trace indicative of the movements of the instrument in following the target which trace, if the tracking of the target has been accurate, will be traced over by the fixed stylus 190.

The elevating hand wheel 223 is located on the left side of the instrument near the forward end. This hand wheel is mounted on the outer end of a shaft 224 which is journalled in a tubular casing 225 flanged at one end for attachment to the instrument casing. On the inner end of this shaft is secured a gear 226 adapted to mesh with a gear 227 on the lower end of the shaft 228 which is journalled in suitable brackets secured to a wall of the casing and it has on its upper end worm 229 meshing with a worm wheel 230 on a shaft 231 which extends transversely of the instrument and on the projecting ends of which are secured the observation telescopes 232 and 233, the former for the azimuth pointer and the latter for the elevation pointer. The gear 226 also meshes with a gear 234 near the forward end of a shaft 235 which extends longitudinally of the instrument at the left side thereof. On the rear end of this horizontal shaft is a beveled pinion 236 which meshes with bevel pinion 237 on a lead screw 238 extending transversely of the instrument at the rear end thereof, the threads of which mesh with threads of a split nut 202 secured to the record strip carriage, so that rotation of the screw causes travel of the carriage, as heretofore described. This carriage, being a counterpart of the carriage described in relation to the traversing mechanism need not be detailed here further than to say that the shaft is rotated through the hand operating means to move the movable marker to leave a trace that will subsequently be traced over by the fixed stylus as hereinbefore set forth in relation to the traversing operations.

At a median point on the shaft 235 toward the rear end thereof, is a spur gear 239 meshing with a gear 240 on one side of horizontally disposed differential 241 on the other side of which is a bevel gears 242 meshing with a bevel gear 243 on the lower end of the vertically disposed shaft 37, situated at the left rear end of the instrument and journalled within the casing, which shaft has mounted thereon the gear 36 and the upper end of which shaft is operatively connected to a differential 244 (Fig. 11), from the other side of which differential extends a vertical shaft 245 carrying an elevation indicating dial 246, associated with which is a tally dial 247, worm driven as indicated at 248 to give readings of fine graduations. As long as the differential 241 remains at zero setting, rotation of the elevation hand wheel will register on the elevation dial true elevation to present position of the target but, when the differential has been properly moved from zero, the dial will read true elevation to which has been added algebraically a sum equal to the amount of displacement of the differential. The differential 241 is moved from normal position through rotation of a shaft 249 in moving the movable stylus by reason of the fact that this shaft has formed thereon a worm 250 which meshes with a worm wheel 251 on the differential casing.

Rotation of the vertical shaft 37 causes rotation of the gear 36 thereon which meshes with the gear 35 (Fig. 10) on the jack shaft 34 causing rotation of such shaft and, through the worms 32 and 33 thereon, which meshes with the wheels 30 and 31, respectively, on the upper and lower cam shafts causes rotation of such shafts to position the cams in accordance with changes in elevation. Shaft 249 (Fig. 11), near the right end thereof, carries a worm 252 which meshes with a worm wheel on the lower end of a vertical shaft 253 which has connection at its upper end to a differential 254 from the upper side of which differential extends a short shaft 255 bearing on its upper end a vertical deflection dial 256, which has associated with it a tally dial 257 worm driven as indicated at 258.

Located at the rear end of the instrument and occupying a position between the elevation dial and the vertical deflection dial is a drum divided into two portions 259 and 260, on the right hand, one of which is engraved curves of heights or altitude while on the left hand, one is engraved curves of slant range. Between these two portions the drum is provided with a worm wheel 261 meshing with a worm 262 on the shaft 41 (Fig. 16) extending longitudinally of the instrument and provided on its rear protruding end with a manipulating wheel 264 so that, by rotating the shaft the proper altitude or slant range as the case may be set into the instrument. When this shaft is rotated, the carriage 38 carrying the followers 39 is moved longitudinally of the well, as hereinbefore set forth. A shutter 265 may be provided for blocking off that portion of the drum which is not in use.

Situated on the right side of the instrument toward the rear thereof (see Fig. 2) is a time of flight indicator 72 from which the indicated time of flight is read and set back into the instrument through manipulation of a knob 266 situated on top of the instrument and secured to the protruding end of a vertical shaft 267 (see Figs. 6, 7, 9, 11 and 30) on which is a worm 268 meshing with a worm wheel 269 on the shaft of a drum 270 which is located at the right side of the instrument. The drum 270 is engraved with two families of curves of fuse range, one set being applicable in the case of aerial targets where the altitude is set into the instrument and the other set being applicable to other targets when the slant range is set into the instrument. A shutter 271 may be provided for setting indexes on the curves not in use. On the lower end of the shaft 267 is a worm 272 meshing with a worm wheel 273 secured to a median portion of a shaft 274 which extends longitudinally of the right side of the instrument and on the ends of which are worms 275 meshing with their respective worm wheels 276 on the transverse shafts 277 formed with elongated pinions 278 meshing with the respective racks 279 of the movable markers 189 so that each movable marker may be set at an interval from its respective fixed marker proportionate to the time of flight.

The movements produced by the cams on the elevation side through mechanism which are a duplicate of those described in relation to the time side of the cam are indicated on a superelevation indicator 72 situated on the left side of the instrument. Superelevation as indicated is set back into the instrument through manipulation of a thumb wheel 280 (Figs. 3, 4, 6, 7 and 9), fast on the protruding end of a transverse shaft 281 located at the rear end of the instrument. On median portions of this shaft are worms meshing respectively with worm wheels on the vertically disposed differentials 244 and 254 located at the rear end of the instrument, so that rotation of the thumb wheel rotates the casings of the differentials, introducing superelevation into the reading of their respective dials.

The operation of the device is as follows:—

The known muzzle velocity is set into the instrument by manipulation of the dial 93. This dial is mounted on the transverse shaft 94 which carries pinions 96 meshing with racks 51 of the levers associated with the correction cam designed to give corrections for changes in muzzle velocity from normal muzzle velocity. Movement of these racks moves contact members 54 with respect to the pivotal axis of plate 47, thereby changing the amount of movement imparted to the members 55.

The same result is had upon setting of the dial 97 which is mounted on the transverse shaft 98 carrying pinions which mesh with racks 51 of the levers associated with the correction cam designed to give corrections for a change in the ballistic coefficient from the normal ballistic coefficient.

Setting in velocity of wind through knob 110, and azimuth of wind through knob 120 will, as heretofore described cause the contact element of the multiplying lever of the lateral deflection cam to be moved and will also cause the contact members of the multiplying levers of the cam which gives corrections for a head wind of 60 feet per second to be properly moved.

Range is set into the instrument through manipulation of the wheel 264 on shaft 41 which results in turning the range drums to the proper range reading through the worm 262 and worm wheel 261 (see Fig. 11) and also shifts the carriage 38, (Figs. 16 and 17) through the threaded portion 42 of shaft 41 and nut 43 thereby setting the followers 39 to the positions on the cams corresponding to the given range.

The elevation pointer viewing the target through his telescope 232, endeavors to keep the horizontal cross hair thereof on the target by manipulation of the elevation hand wheel 223 which through gears 226 and 234 will cause rotation of shaft 235. Rotation of shaft 235 will through gears 239 and 240 drive through the differential 241 the gears 242 and 243 thereby rotating shaft 37 and through gears 36 and 35 imparting rotation to jack shaft 34. Rotation of jack shaft 34 will through worms 32 and 33 and their respective worm wheels 30 and 31 impart angular movement to the shafts 23 and 24, thereby turning the cams to positions corresponding to changes in elevation.

The movements which have heretofore been described as imparted to the contact members, the carriage and the cams has resulted in moving the levers of the correction cams and the movements of these levers have been imparted to the members 58 to give a resultant movement proportional to the sum of the movements. These resultant movements are combined through the levers 62 with the movements of the multiplying levers of the normal cam to give a resultant movement which is imparted through the bell crank levers 67 and operating rods 71 to the indicators 72, the indicator on the elevation side giving superelevation and that on the time side giving time of flight.

The time setter reads indicated time of flight for the predicted position of the target on the time of flight indicator 72 and, by manipulating knob 266 which through the worm gearing 268 and 269 rotates the fuze range drum to set the same to the indicated time of flight. At the same time through gearing 272 shaft 274 is rotated, causing, through gearing 275 and 276, movement of the movable markers to a position indicative of the time of flight thus causing the elevation and azimuth predictors to operate their respective knurled rollers 176 thereby resetting the dials 173, 184, 246, and 256. The elevation setter reads superelevation on his dial 72 and manipulates wheel 280 to set superelevation into the instrument. Manipulation of wheel 280 rotates shaft 281 which through worm gearing (see Fig. 11) drives through differentials 244 and 254 the respective dials 246 and 256 to the proper setting for the superelevation.

The azimuth pointer viewing the target through telescope 233 endeavors to keep the vertical cross hair of his telescope on the target through manipulation of the traversing hand wheel 144 and in doing so rotates through bevel gears 157 and 158 the shaft 20. Rotation of the shaft 20 causes through gears 159 and 160 rotation of shaft 161 and through differential 162 rotation of shaft 128 which through worm 127 and worm wheel 126 introduces the proper changes into the movements caused by the wind component instrument made necessary by the changes in azimuth.

Rotation of shaft 20 also causes through gears 200 and 201 (Fig. 6) rotation of the lead screw 199 thereby moving the carriage 198 at the front end of the instrument which will cause the azimuth predictor to manipulate the roller 176 in an attempt to bring the movable marker into proper position to leave a trace which will be traced over by the fixed stylus. Manipulation of the roller 176 will rotate shaft 165 which through worm 164 and worm wheel 163 will give the algebraic sum of this movement and the movement already imparted to the differential through shaft 161.

Rotation of shaft 161 causes, through bevel gears 166 and 167 rotation of shaft 168 which through differential 169 causes angular movement of the azimuth dial 173.

The azimuth predictor views the dials 73 and 195, and as dial 73 with its reference point is moved from zero setting by the lift of the lateral deflection cam through levers 75 and 77 (Fig. 12) cable 76, rack 85, pinion 86 segment 90 and pinion 91 he turns thumb wheel 161, thereby rotating shaft 172 which through worm 192 and worm wheel 193 will rotate dial 195 to bring its reference point 196 again into register with the zero mark of dial 73. Movement of shaft 172 also causes through worms 171 and 182 and worm wheels 170 and 181 movement to be imparted through differentials 169 and 180 to the respective dials 173 and 184 to thereby introduce into their readings lateral deflection corrections.

What is claimed is,

1. In a fire control instrument the combination with means for producing movements proportional to selected data, of means for combining such movements including elements located at the apices of an equilateral triangle and adapted to be displaced by the respective movements, and means for taking off the resultant of the movements of said elements from a point equidistant from said elements.

2. In a fire control instrument the combination with means for producing movements proportional to selected data, of means for combining such movements including elements located at the apices of an equilateral triangle and adapted to be displaced by the respective movements, means for taking off the resultant of the movement of said elements from a point equidistant from said elements, means for producing a movement proportional to selected datum in accordance with normal range table conditions, and means for combining this movement and the aforesaid resultant movement to produce a movement proportional to desired datum.

3. In a fire control instrument rigidly connected elements located at the apices of an equilateral triangle, means for moving the respective elements proportional to muzzle velocity, ballistic coefficient, and wind velocity, an element moved by a member located at the center point of said triangle, means for producing a movement proportional to data for normal range table conditions, and means for conveying this movement to the last named element whereby a movement is secured proportional to desired datum.

4. A fire control instrument embodying elements movable proportional to selected data, levers engaged by their respective elements, contact members associated with the levers and movable to change the throw of the levers, an equilateral triangle engaged at its apices by respective levers and movable thereby, and means for taking off the resultant movement from a point on the triangle equidistant from the apices.

5. A fire control instrument embodying plungers, cams for moving the plungers proportional to firing data, levers moved by the plungers, a contact member associated with each lever, a rack for moving each contact member with respect to its lever to change the throw of the lever in accordance with desired corrections in data, and means including an equilateral triangle for combining the movements of the levers with the resultant of other movements to produce a movement proportional to desired datum.

6. A fire control instrument embodying plungers, cams for moving the plungers proportional to firing data, levers moved by said plungers, a contact member associated with each lever, a rack carried by each contact member, means engaging each rack for moving its contact member with respect to the lever to change the throw of the lever in accordance with desired corrections in data, and means including an equilateral triangle for combining the movements of the levers with the resultant of other movements to produce a movement proportional to desired datum.

MARIE P. WILSON,
*Administratrix of the Estate of William P. Wilson, Deceased.*